(12) United States Patent
Clairadin et al.

(10) Patent No.: US 6,445,866 B1
(45) Date of Patent: Sep. 3, 2002

(54) OPTICAL INTERCONNECTION APPARATUS AND METHOD OF FABRICATING SAME

(75) Inventors: Xavier Clairadin, Naperville; Igor Grois, Northbrook; Thomas R. Marrapode, Bolingbrook; Maurice X. Sun, Westmont, all of IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/450,327

(22) Filed: Nov. 29, 1999

(51) Int. Cl.[7] .................................................. G02B 6/00
(52) U.S. Cl. ........................ 385/137; 385/134; 385/111; 385/114; 385/104
(58) Field of Search ................................. 385/137, 134, 385/100, 104, 111, 114, 120; 428/375, 378

(56) References Cited

U.S. PATENT DOCUMENTS

| | | | |
|---|---|---|---|
| 5,204,925 A | | 4/1993 | Bonanni et al. ............... 385/89 |
| 5,292,390 A | * | 3/1994 | Burack et al. ............... 156/176 |
| 5,327,513 A | * | 7/1994 | Nguyen et al. ............. 385/114 |
| 5,878,179 A | * | 3/1999 | Schricker .................... 385/100 |
| 5,974,214 A | * | 10/1999 | Shacklette et al. ............. 385/50 |
| 5,981,064 A | * | 11/1999 | Burack et al. ............... 428/375 |
| 6,005,991 A | * | 12/1999 | Knasel ......................... 385/14 |

FOREIGN PATENT DOCUMENTS

| | | | |
|---|---|---|---|
| EP | 1 067 418 A1 | 1/2001 | ............ G02B/6/44 |
| JP | 7-318741 | 12/1995 | ........... G02B/6/255 |
| JP | 10-239535 | 9/1998 | ............ G02B/6/04 |
| JP | 10-339818 | 12/1998 | ............ G02B/6/00 |
| WO | WO99/46621 | 9/1999 | ............ G02B/6/44 |

OTHER PUBLICATIONS

Blumbach, Kramer & Partner, European Search Report, Nov. 7, 2001.

* cited by examiner

*Primary Examiner*—Hemang Sanghavi
*Assistant Examiner*—Sung Pak
(74) *Attorney, Agent, or Firm*—A. A. Tirva

(57) ABSTRACT

An optical fiber interconnection apparatus includes a flat flexible body member defined by a peripheral edge void of any projections. A plurality of optical fibers are mounted to the body member so that their ends extend beyond the peripheral edge and the ends of a plurality of the fibers extend to different locations of the edge. A method of fabricating the interconnection apparatus includes providing a flat release substrate onto which the flat flexible body member is adhered. After the optical fibers are mounted to the body member, the assembly of the body member and fibers are peeled off of the release substrate.

8 Claims, 2 Drawing Sheets

OPTICAL INTERCONNECTION APPARATUS AND METHOD OF FABRICATING SAME

FIELD OF THE INVENTION

This invention generally relates to the art of optical fibers and, particularly, to an optical fiber interconnection apparatus and a method of fabricating the apparatus.

BACKGROUND OF THE INVENTION

Fiber optics are being used in electronic systems with ever-increasing frequency and intensity, because optical fibers can transmit much greater quantities of information than electrical conductors. In increasing numbers of applications, an optical as well as electrical interconnection is desirable between circuit components. Electrical energy is translated to optical energy which is transmitted by an optical fiber or fibers between electronic components, such as printed wiring or circuit boards. One of the problems with using optical fibers is that they are extremely small and difficult to handle. A typical fiber may be an acrylic coated glass fiber having a total outside diameter of 250 microns. These tiny fibers are fragile and cannot withstand abrupt turns or the like. Consequently, it has become known to bond the fibers to flat flexible substrates to form what is called an optical backplane. The present invention is directed to improvements in optical fiber interconnection apparatus or backplanes to address the problems of handling or manipulating optical fibers in interconnection systems.

SUMMARY OF THE INVENTION

An object, therefore, of the invention is to provide a new and improved optical fiber interconnection apparatus.

Another object of the invention is to provide a method of fabricating the improved optical interconnection apparatus.

In the exemplary embodiment of the invention, the apparatus includes a flat flexible body member defined by a peripheral edge void of any projections. A plurality of optical fibers are mounted to the body member so that their ends extend beyond the peripheral edge, and the ends of a plurality of the fibers extend to different locations of the edge.

As disclosed herein, the optical fibers are mounted to the body member by a pressure sensitive adhesive. In one embodiment of the invention, a coating is applied over the body member, adhesive and fibers. The coating covers the ends of the fibers extending beyond the peripheral edge. The coating comprises a conformal layer having a silicone resin base. Still a further embodiment of the invention includes a second flat flexible body member over the plurality of optical fibers, along with a second plurality of optical fibers mounted to the second body member.

The invention contemplates a method of fabricating an optical interconnection apparatus, including the steps of providing a flat release substrate. Adhering a flat flexible body member to the release substrate, with the body member being provided with a peripheral edge void of any projections. A plurality of optical fibers are mounted to the body member as described above, and the body member and optical fibers then are peeled as an assembly from the release substrate.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
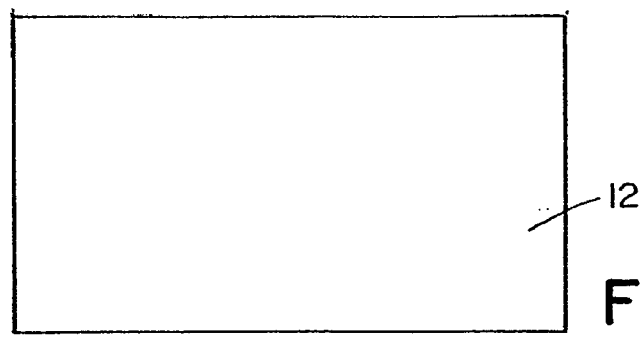
FIGS. 1–4 are plan views representing some of the steps in the method of fabricating the optical fiber interconnection apparatus of the invention.

Referring to the drawings in greater detail, and first to FIGS. 1–4, the optical fiber interconnection apparatus, generally designated 10 (FIG. 4), of the invention will be described in conjunction with the method of fabricating the apparatus. This will provide a clear and concise understanding of the structure of interconnection apparatus 10 by proceeding sequentially through the steps of fabricating the apparatus.

With that understanding, the first step in fabricating optical fiber interconnection apparatus 10 is to provide a flat release substrate 12 as shown in FIG. 1. The substrate is covered with a "low tack" adhesive to, in essence, provide a release sheet upon which interconnection apparatus 10 can be fabricated and from which the apparatus can be removed. The substrate may be formed by a polyester sheet which is inexpensive so that it can be discarded after fabricating a single apparatus 10.

Figure 2:
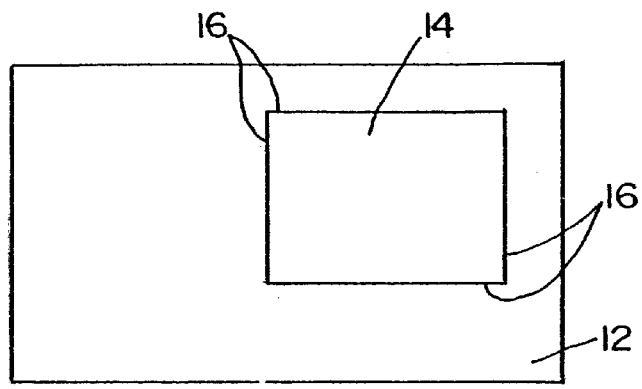

A flat flexible body member 14 then is adhered to substrate 12 as shown in FIG. 2. The flat flexible body member is a flexible polymer sheet, such as of polyimide material. The body member is generally rectangular as defined by a peripheral edge 16 void of any projections. The body member is coated with a pressure sensitive adhesive, such as acrylic adhesive typically applied to coated release paper. This adhesive requires the application of some pressure for adhesion and, therefore, is easier to work with than conventional adhesives.

A plurality of optical fibers 18 (FIG. 3) then are mounted to body member 14 by employing the pressure sensitive adhesive thereon, as described above. Ends 18a of optical fibers 18 extend beyond peripheral edge 16 of body member 14. It can be seen that the ends of the fibers extend to different locations 16a of edge 16 of the body member.

Figure 3:
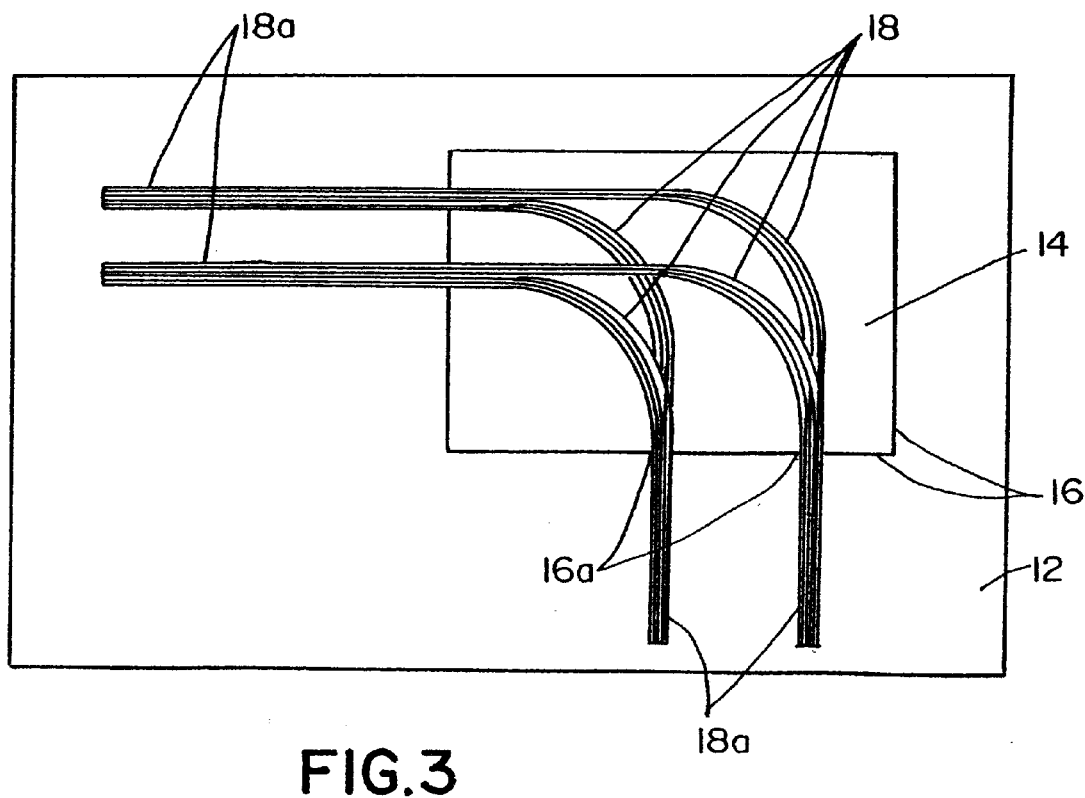
Figure 5:
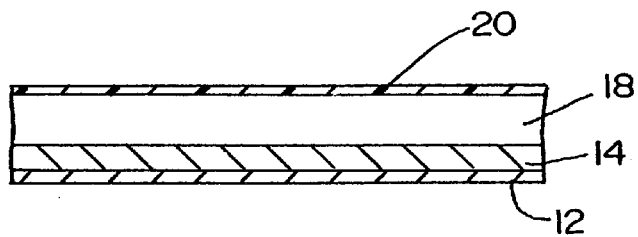
FIG. 5 is a fragmented section through one embodiment of the interconnection apparatus.

The next step is to apply a coating over body member 14, fibers 18 and fiber ends 18a in the configuration shown in FIG. 3. The coating covers the pressure sensitive adhesive on body member 14 and "ribbonizes" fiber ends 18a as will be described in greater detail hereinafter. FIG. 5 shows a fragmented section illustrating the coating 20 covering an optical fiber 18 adhered to body member 14 which, in turn, is adhered to substrate 12. The coating is a conformal coating, such as having a silicone resin base. The coating holds fibers 18 down onto the top of body member 14.

Figure 4:
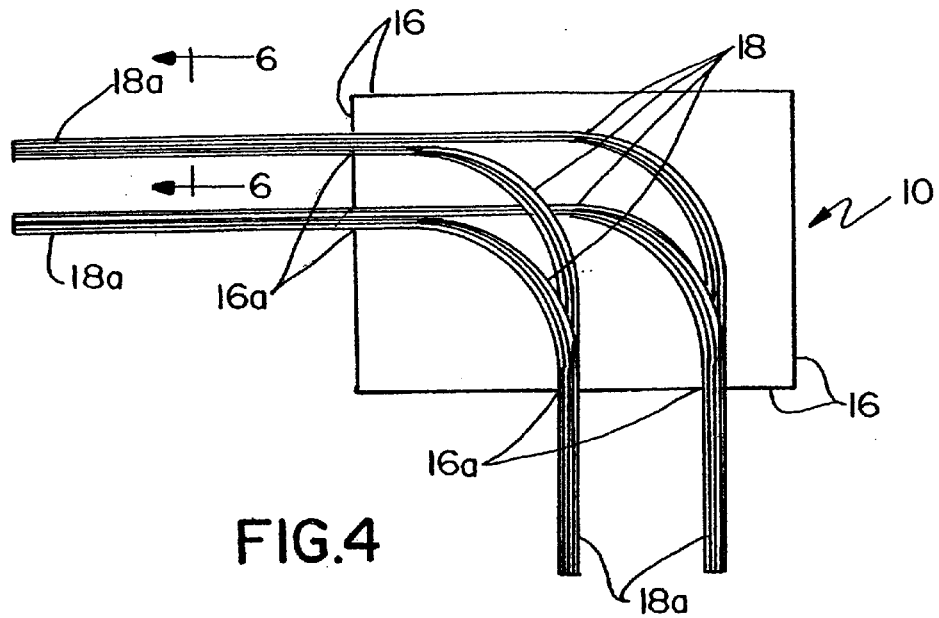

Interconnection apparatus 10 shown in FIG. 4 then is removed as an assembly from release substrate 12 by peeling the assembly off of the substrate so that a complete product is fabricated as shown in FIG. 4.

Figure 6:
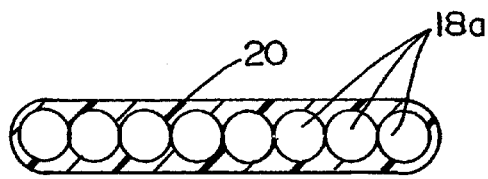
FIG. 6 is a section through the ends of a plurality of fibers extending beyond the body member of the apparatus, as might be taken generally along line 6—6 of FIG. 4.

FIG. 6 shows a section through the ends 18a of a plurality of the optical fibers extending beyond peripheral edge 16 of body member 14, as might be taken along line 6—6 in FIG. 4. It can be seen that conformal coating 20 substantially surrounds the fiber ends which originally lay flat on top of substrate 12. The coating holds the fibers together and, in essence, "ribbonizes" the fiber ends so that they stay together and are not broken or tangled.

Figure 7:
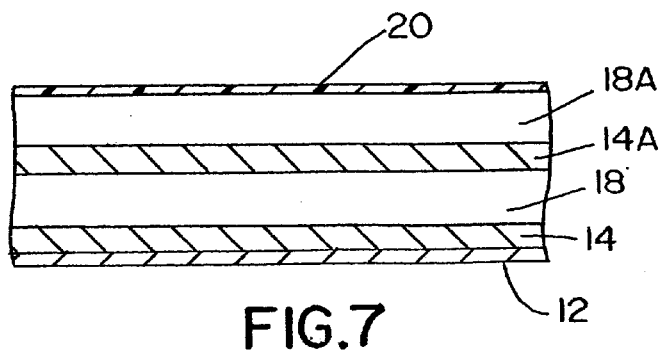
FIG. 7 is a view similar to that of FIG. 5, but showing an embodiment involving multiple body members and associated fibers.

FIG. 7 shows an alternative embodiment of the invention wherein a second body member 14A is applied over optical fibers 18 which are adhered to first body member 14. The second body member can be adhered to the first body member in areas between and outside fibers 18 by employing the pressure sensitive adhesive on top of the first body member. Second body member 14A also has a top surface with a pressure sensitive adhesive thereon. Therefore, a second plurality of optical fibers 18A can be mounted on second body member 14A as described with fibers 18 on first body member 14. Again, conformal coating 20 is applied over the top of the second plurality of optical fibers and the second body member as is shown in FIG. 7. Of course, it should be understood that further body members can be employed to further "layer" or laminate the interconnection apparatus of the invention.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An optical fiber interconnection apparatus, comprising:
   a flat flexible body member defined by a peripheral edge void of any projections;
   a plurality of optical fibers mounted to the body member by a pressure sensitive adhesive so that their ends extend beyond said peripheral edge and the ends of a plurality of the fibers extend to different locations of the edge; and
   a coating over the body member, adhesive and fibers, the coating covering the ends of the fibers extending beyond said peripheral edge.

2. The optical interconnection apparatus of claim 1 wherein said coating comprises a conformal layer having a silicone resin base.

3. The optical interconnection apparatus of claim 1 wherein said body member comprises a flexible polymer sheet.

4. The optical interconnection apparatus of claim 1, including a second flat flexible body member over said plurality of optical fibers, and a second plurality of optical fibers mounted to the second body member.

5. The optical interconnection apparatus of claim 4, including a coating over the second body member and second fibers.

6. A method of fabricating an optical fiber interconnection apparatus, comprising the steps of:
   providing a flat release substrate;
   adhering a flat flexible body member to the release substrate with the body member being provided with a peripheral edge void of any projections;
   mounting to the body member by a pressure sensitive adhesive a plurality of optical fibers so that their ends extend beyond said peripheral edge onto the substrate and the ends of a plurality of the fibers extend to different locations of the edge;
   applying a coating over the body member, adhesive and fibers with the coating being applied over the ends of the fibers extending beyond said peripheral edge; and
   peeling the body member and optical fibers as an assembly from the release substrate.

7. The method of claim 6 wherein said coating is provided as a conformal layer having a silicone resin base.

8. The method of claim 6 wherein said body member is provided as a flexible polymer sheet.

* * * * *